US011494158B2

(12) United States Patent
Reiger et al.

(10) Patent No.: US 11,494,158 B2
(45) Date of Patent: Nov. 8, 2022

(54) AUGMENTED REALITY MICROPHONE PICK-UP PATTERN VISUALIZATION

(71) Applicant: Shure Acquisition Holdings, Inc., Niles, IL (US)

(72) Inventors: Christopher George Reiger, Chicago, IL (US); Mathew T. Abraham, Colorado Springs, CO (US)

(73) Assignee: Shure Acquisition Holdings, Inc., Niles, IL (US)

(*) Notice: Subject to any disclaimer, the term of this patent is extended or adjusted under 35 U.S.C. 154(b) by 0 days.

(21) Appl. No.: 16/408,061

(22) Filed: May 9, 2019

(65) Prior Publication Data

US 2019/0369951 A1 Dec. 5, 2019

Related U.S. Application Data

(60) Provisional application No. 62/678,874, filed on May 31, 2018.

(51) Int. Cl.
*G06F 3/16* (2006.01)
*H04R 1/40* (2006.01)
*H04R 3/00* (2006.01)

(52) U.S. Cl.
CPC ............. *G06F 3/165* (2013.01); *H04R 1/406* (2013.01); *H04R 3/005* (2013.01)

(58) Field of Classification Search
CPC .... G06F 3/165; G06F 3/0484; G06F 3/04845; G06F 3/04847; G06F 3/0486;
(Continued)

(56) References Cited

U.S. PATENT DOCUMENTS 3,054,990 A1   11/2011   Gratke
9,131,305 B2   9/2015    Li
(Continued)

FOREIGN PATENT DOCUMENTS

DE   102015210405   12/2016
EP       3155560     4/2017
(Continued)

OTHER PUBLICATIONS

Youtube, "Arapolarmic Tutorial 1", https://youtu.be/VuJbSyLga_U?list=PLeqUvvNW8bxkg1bLY3pgx1XtBfofGrK4j, dated Jul. 8, 2014, screen printout pp. 1-19 (Year: 2014).*
(Continued)

*Primary Examiner* — Ariel Mercado
*Assistant Examiner* — William Wong
(74) *Attorney, Agent, or Firm* — Neal, Gerber & Eisenberg LLP (57) ABSTRACT

Augmented reality visual display of microphone pick-up patterns are disclosed. An example method includes capturing, via a camera of a computing device, an image of a microphone, and displaying the image on a display of the computing device. The method also includes determining, by the computing device, a location and orientation of the microphone relative to the camera, determining one or more parameters of a pick-up pattern of the microphone, determining a visual representation of the pick-up pattern based on the one or more parameters, and displaying the visual representation of the pick-up pattern overlaid on the image of the microphone.

20 Claims, 7 Drawing Sheets

(58) Field of Classification Search
CPC ..... G06F 3/0487; G06F 3/0488; H04R 1/406; H04R 3/005
See application file for complete search history.

(56) References Cited

U.S. PATENT DOCUMENTS

| | | | |
|---|---|---|---|
| 9,286,898 B2 | 3/2016 | Xiang | |
| 9,326,060 B2 | 4/2016 | Nicholson | |
| 9,338,575 B2 | 5/2016 | Mitra | |
| 9,462,378 B2 | 10/2016 | Kuech | |
| 9,489,948 B1 | 11/2016 | Chu | |
| 9,723,403 B2 | 8/2017 | Mcelveen | |
| 9,736,580 B2 | 8/2017 | Cahill | |
| 10,212,529 B1* | 2/2019 | Keen | H04R 29/008 |
| 2002/0069054 A1* | 6/2002 | Arrowood | G10L 21/0208 |
| | | | 704/233 |
| 2003/0118200 A1* | 6/2003 | Beaucoup | H04M 3/56 |
| | | | 381/92 |
| 2004/0120532 A1* | 6/2004 | Dedieu | H04R 1/406 |
| | | | 381/92 |
| 2006/0159281 A1* | 7/2006 | Koh | H04R 3/005 |
| | | | 381/92 |
| 2012/0027217 A1 | 2/2012 | Jun | |
| 2012/0163625 A1* | 6/2012 | Siotis | H04R 3/005 |
| | | | 381/92 |
| 2013/0226593 A1* | 8/2013 | Magnusson | H04N 5/765 |
| | | | 704/276 |
| 2014/0136203 A1* | 5/2014 | Liu | G06F 3/167 |
| | | | 704/246 |
| 2014/0136981 A1* | 5/2014 | Xiang | H04S 7/40 |
| | | | 715/728 |
| 2015/0230024 A1* | 8/2015 | Goshen | H04R 3/005 |
| | | | 381/92 |
| 2016/0142830 A1 | 5/2016 | Hu | |
| 2016/0227337 A1 | 8/2016 | Goodwin | |
| 2016/0381459 A1 | 12/2016 | Baca | |
| 2017/0064444 A1 | 3/2017 | Tawada | |
| 2018/0007481 A1 | 1/2018 | Tawada | |
| 2018/0225082 A1* | 8/2018 | An | G06F 3/165 |
| 2018/0262857 A1* | 9/2018 | Okuma | H04S 3/008 |
| 2018/0350149 A1* | 12/2018 | Dandekar | G06F 3/04847 |
| 2019/0188913 A1* | 6/2019 | Cho | G06T 15/50 |

FOREIGN PATENT DOCUMENTS

| | | |
|---|---|---|
| JP | 2005159731 | 6/2005 |
| JP | 2010236939 | 10/2010 |
| JP | 5664215 | 2/2015 |
| WO | 2004084577 | 9/2004 |
| WO | 2012063103 | 5/2012 |
| WO | 2015192117 | 12/2015 |

OTHER PUBLICATIONS

Youtube, "Arapolarmic Tutorial 5", https://youtu.be/xzXhtqVM018?list=PLeqUvvNW8bxkg1bLY3pgx1XtBfofGrK4j. Jul. 8, 2014, screen printout pp. 1-12 (Year: 2014).*

Aratechlabs, Press Release, Arapolarmic-Augmented Reality Mic Directivity, Jul. 28, 2014, 3 pp.

International Search Report and Written Opinion for PCT/US2019/031610 dated Oct. 8, 2019, 10 pp.

Music Blueprints—a comprehensive online guide to 3D audio recording, Live-Production TV, Nov. 19, 2016, 5 pp.

* cited by examiner

AUGMENTED REALITY MICROPHONE PICK-UP PATTERN VISUALIZATION

CROSS-REFERENCE

This application claims priority to U.S. Provisional Patent Application No. 62/678,874, filed May 31, 2018, the contents of which are incorporated by reference herein in their entirety.

TECHNICAL FIELD

This application generally relates to the use of augmented reality to visualize the pick-up pattern of a microphone. In particular, this application relates to visually displaying the pick-up pattern of a microphone on a remote computing device, and enabling a user to modify the pick-up pattern using the remote computing device.

BACKGROUND

Conferencing environments, such as boardrooms, video conferencing settings, and the like, can involve the use of microphones for capturing sound from audio sources. The audio sources may include human speakers, for example. The captured sound may be disseminated to an audience through loudspeakers in the environment, a telecast, a webcast, telephony, etc. The types of microphones and their placement in a particular environment may depend on the locations of the audio sources, physical space requirements, aesthetics, room layout, and/or other considerations. For example, in some environments, the microphones may be placed on a table or lectern near the audio sources. In other environments, the microphones may be mounted overhead to capture the sound from the entire room, for example. Accordingly, microphones are available in a variety of sizes, form factors, mounting options, and wiring options to suit the needs of particular environments.

The types of microphones that can be used may include boundary microphones and button microphones that can be positioned on or in a surface (e.g., a table), shotgun microphones that are primarily sensitive to sounds in one direction, and many other types of microphone. Each microphone or set of microphones can have a particular pick-up pattern tailored for use in a given environment. Typical polar patterns for microphones can include omnidirectional, cardioid, subcardioid, supercardioid, hypercardioid, and bidirectional. The polar pattern chosen for a particular microphone or cartridge may be dependent on where the audio source is located, the desire to exclude unwanted noises, and/or other considerations.

Accordingly, there is an opportunity for a system or method for visually representing the microphone pick-up patterns and enabling control of the direction and other parameters of the pick-up pattern by a user.

SUMMARY

The invention is intended to solve the above-noted problems by providing systems, devices, and methods for using augmented reality to visually represent the pick-up pattern of one or more microphones. In one example, a method may include capturing, via a camera of a computing device, an image of a microphone. The method also includes displaying the image on a display of the computing device. The method further includes determining, by the computing device, a location and orientation of the microphone relative to the camera. The method still further includes determining one or more parameters of a pick-up pattern of the microphone. The method yet further includes determining a visual representation of the pick-up pattern based on the one or more parameters. And the method further includes displaying the visual representation of the pick-up pattern overlaid on the image of the microphone.

In a second example, a computing device may include a camera configured to capture an image of a microphone, a user interface, and a processor. The processor may be configured to display the image of the microphone on the user interface. The processor is also configured to determine a location and orientation of the microphone relative to the camera. The processor is further configured to determine one or more parameters of a pick-up pattern of the microphone. The processor is yet further configured to determine a visual representation of the pick-up pattern based on the one or more parameters. And the processor is still further configured to display the visual representation of the pick-up pattern overlaid on the image of the microphone.

In a third example, a non-transitory, computer-readable medium may have instructions stored thereon that, when executed by a processor, cause the performance of a set of acts. The set of acts includes capturing, via a camera of a computing device, an image of a microphone. The set of acts further includes displaying the image on a user-interface of the computing device. The set of acts also includes determining a location and orientation of the microphone relative to the camera. The set of acts further includes determining one or more parameters of a pick-up pattern of the microphone. The set of acts yet further includes determining a visual representation of the pick-up pattern based on the one or more parameters. And the set of acts still further includes displaying the visual representation of the pick-up pattern overlaid on the image of the microphone.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

As noted above, microphones may be used in many environments in order to collect audio that, for example, may be used for either immediate or delayed playback via a loudspeaker. In doing so, the microphones may make use of particular pick-up patterns. Each microphone may have a unique pick-up pattern specific to the microphone type, orientation, and one or more other characteristics of the microphone and corresponding equipment. In many instances, it may be beneficial to allow a person to view the pick-up pattern for a given microphone while the microphone is positioned inside the environment it will ultimately be used. This can allow the person to move the microphone or direct the pick-up pattern based on the microphone's intended use (e.g., toward a speaker using a lectern, toward a seat around a conference table, etc.).

Augmented reality can allow a user to view a scene or environment, with additional information overlaid on the user's view. For instance, a user may have a smartphone with a camera, and may use the camera to capture an environment including a microphone. The microphone position and orientation with respect to the camera may be determined (either by the smartphone, or by another computing device. Further, the pickup pattern specific to the microphone may be determined by the smartphone, either via communication with the microphone or another device, or via an input into the smartphone itself. Based on the location and orientation of the microphone, as well as a known pick-up pattern of the microphone, the smartphone may overlay the pickup pattern on the view captured by the camera. This can allow the user to see in real-time where the pick-up pattern is strong or weak, where it is aimed or directed, what shape it takes, whether it covers an intended area, and much more. It may also allow the user to alter the pick-up pattern by moving the microphone while simultaneously viewing the change in pickup-pattern direction, or modifying one or more microphone characteristics to aim or steer the pick-up of the microphone.

For a fixed pattern microphone, the smartphone or other computing device may recognize the orientation of the microphone and overlay a corresponding fixed pick-up pattern for viewing by the user. Example pick-up patterns may include omnidirectional, cardioid, sub cardioid, super cardioid, hyper cardioid, bidirectional, and/or toroidal shapes. For a steerable microphones (e.g., a microphone array), the smartphone may communicate with the microphone in order to retrieve lobe coordinates. These coordinates may then be used to dynamically overlay the pick-up pattern of the microphones. In this disclosure, reference may be made to a steerable microphone or steerable pattern microphone. It should be understood that these terms may refer to a microphone or microphone array having one or more steerable pick-up patterns that may have variable directions. The microphone or array may be called steerable regardless of whether the microphone itself is moved when the pick-up pattern changes direction.

In some examples, the smartphone may also include features that enable the user to modify the pick-up pattern of a given microphone within the camera view. The user may click, touch and drag, or otherwise interact with the displayed overlaid pick-up pattern, moving the pattern from one direction to another. The microphone may then dynamically update the lobe coordinates in the microphone. Many other benefits and features will become apparent based on the embodiments disclosed herein.

Figure 1:
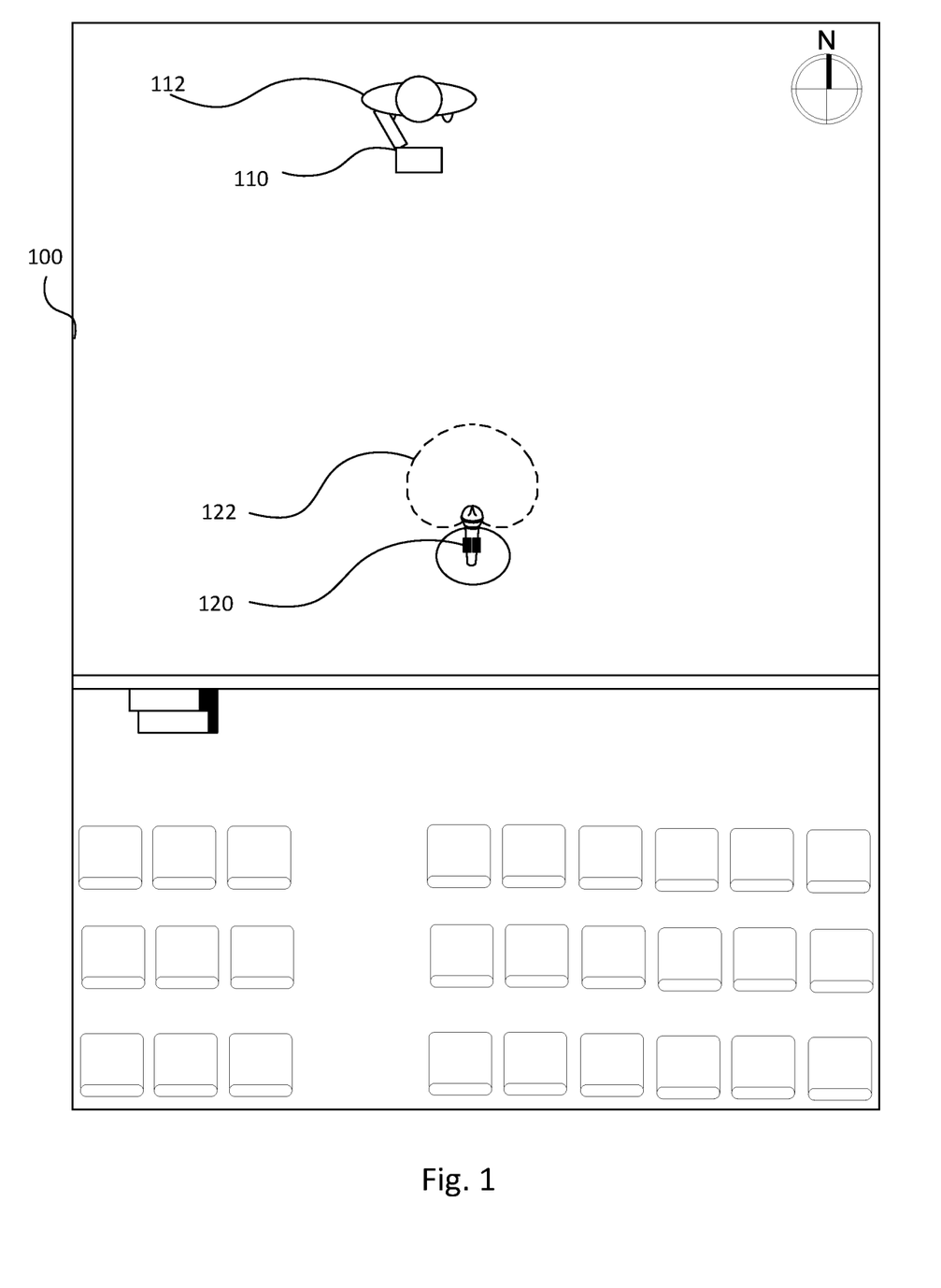
FIG. 1 is a schematic representation of an exemplary environment including a microphone, according to embodiments of the present disclosure.

FIG. 1 illustrates an example environment 100 in which methods, systems, and devices disclosed herein may be used. FIG. 1 shows an overhead perspective view of a room 100 having a stage with a microphone 120 placed thereon, and a plurality of seats for an audience. While FIG. 1 illustrates one possible environment, it should be understood that the concepts and features disclosed herein may be applied to microphones used in any environment, including but not limited to boardrooms, conference rooms, offices, theaters, and more.

In one scenario, user 112 may be in the process of setting up the environment 100 for a speech or other event. User 112 may be using a computing device 110 in order to set up the environment. Setting up the environment may include placing the microphone in a particular location and with a particular orientation, such that a speaker can use the microphone. As will be described in greater detail below, the user 112 may use the camera 114 of the computing device 110 to view the room 110, in particular the microphone 120 having a corresponding pick-up pattern 122. The user 112 may be able to view the pick-up pattern as it relates to the microphone position and orientation, such that as the user moves around the environment 100 he or she is able to view the pick-up pattern from each respective direction. This may enable the user to make adjustments to the microphone in order to properly set up the microphone for use in the environment.

The microphone 120 is shown as a microphone typically used on a stage with a microphone stand. However it should be noted that embodiments of the present disclosure may be used in connection with any type of microphone, including but not limited to boundary microphones and button microphones that can be positioned on or in a surface (e.g., a table), shotgun microphones that are primarily sensitive to sounds in one direction, microphone arrays that can be coupled to or integrated with a ceiling tile or placed on a table, various beamforming microphone arrays, and many other types of microphone.

Computing device 110 may be a smartphone, tablet, laptop, desktop computer, or any other device that may be communicatively coupled to a camera (e.g., camera 114) and a display. In some examples, the computing device 110 may be stationary, such as a desktop computer, and may be communicatively coupled to a camera separate from the computer (e.g., a standalone camera, a camera of a smartphone, etc.). In other examples, computing device 110 may be mobile or non-stationary, such as a smartphone or tablet. In this case, the computing device may also include a camera 114, and/or a display. In some examples, the computing device may be an augmented reality headset (e.g., glasses) that is configured to be worn by a user. The headset may include a display that allows the user to see the real world as well as any overlaid information, images, etc.

Figure 2:
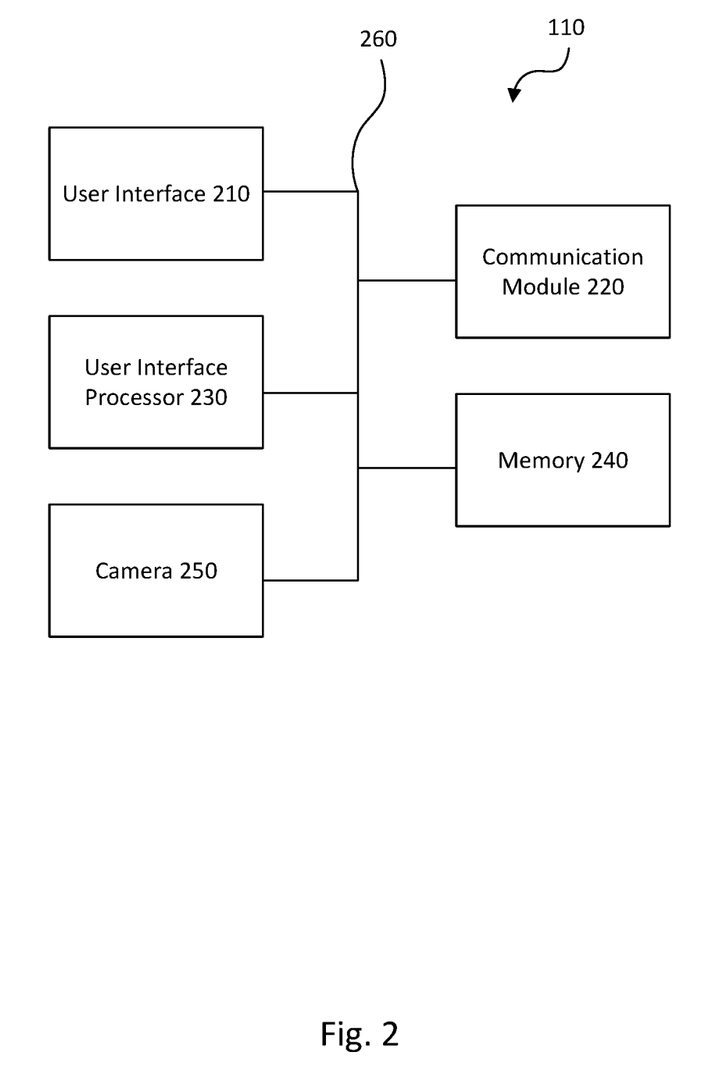
FIG. 2 is a simplified block diagram of an example computing device according to embodiments of the present disclosure.

Computing device 110 is described in more detail with respect to FIG. 2. In particular, FIG. 2 illustrates a simplified block diagram of the example computing device 110 of FIG. 1. Computing device 110 may be configured for performing a variety of functions or acts, such as those described in this disclosure (and accompanying drawings). The computing device 110 may include various components, including for example, a processor 210, memory 220, user interface 230, communication interface 240, and camera 114, all communicatively coupled by system bus, network, or other connection mechanism 250. It should be understood that examples disclosed herein may refer to computing devices and/or systems having components that may or may not be physically located in proximity to each other. Certain embodiments may take the form of cloud based systems or devices, and the term "computing device" should be understood to include distributed systems and devices (such as those based on the cloud), as well as software, firmware, and other components configured to carry out one or more of the functions described herein. Further, as noted above, one or more features of the computing device 110 may be physically remote (e.g., a standalone camera 114) and may be communicatively coupled to the computing device, via the communication interface 240 for example.

Processor 210 may include a general purpose processor (e.g., a microprocessor) and/or a special purpose processor (e.g., a digital signal processor (DSP)). Processor 210 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs).

The memory 220 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 212 includes multiple kinds of memory, particularly volatile memory and non-volatile memory.

The memory 220 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 220, the computer readable medium, and/or within the processor 210 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

User interface 230 may facilitate interaction with a user of the device. As such, user interface 230 may include input components such as a keyboard, a keypad, a mouse, a touch-sensitive panel, a microphone, and a camera, and output components such as a display screen (which, for example, may be combined with a touch-sensitive panel), a sound speaker, and a haptic feedback system. The user interface 230 may also comprise devices that communicate with inputs or outputs, such as a short-range transceiver (RFID, BLUETOOTH®, etc.), a telephonic interface, a cellular communication port, a router, or other types of network communication equipment. The user interface 230 may be internal to the computing device 110, or may be external and connected wirelessly or via connection cable, such as through a universal serial bus port.

Particular uses or features of the user interface 230 are described in further detail below with respect to FIGS. 4A-E.

Communication interface 240 may be configured to allow the device 110 to communicate with one or more devices (or systems) according to one or more protocols. In one example, the communication interface 240 may be a wired interface, such as an Ethernet interface or a high-definition serial-digital-interface (HD-SDI). As another example, the communication interface 40 may be a wireless interface, such as a cellular, BLUETOOTH®, or WI-FI interface.

In some examples, communication interface 240 may enable the computing device 110 to transmit and receive information to/from microphone 120. This can include lobe or pick-up pattern information, position information, orientation information, commands to adjust one or more characteristics of the microphone, and more.

Data bus 250 may include one or more wires, traces, or other mechanisms for communicatively coupling the processor 210, memory 220, user interface 230, communication interface 240, camera 114, and or any other applicable computing device component.

Referring again to FIG. 1, an example method of the present disclosure may include computing device 110 being configured to capture, via a camera 114 corresponding to the device, an image of microphone 120 and the environment within the camera field of view 116. In some examples, the image may be captured with camera 114 of the device itself (e.g., smartphone or tablet camera), while in other examples, the computing device may be configured to receive images from a remote camera device (e.g., a standalone camera, BLUETOOTH® connected camera, or other wired or wirelessly connected camera).

Capturing the image may include taking a still photo, may include taking a video of the microphone, or may be a combination of both.

The example method may also include displaying the image on a display corresponding to the computing device 110. Again, where the computing device 110 includes the camera and the display (e.g., a smartphone or tablet) the computing device 110 may display the image itself. But where the display and/or camera are separate devices, the computing device 110 may be configured to communicate with the display and/or camera such that the captured image(s) are displayed to the user 112.

The example method may further include determining a location and orientation of the microphone relative to the camera. In some examples, the location and orientation may be determined by the computing device 110 itself. In other examples, the location and orientation may be determined by the microphone 120 or another device communicatively coupled to the computing device 110.

The location may be a relative location determined with respect to the camera 114, and/or a relative position with respect to another position within the environment 100. In some examples, the determined orientation of the microphone 120 may include an absolute orientation with respect to some arbitrary frame of reference, or may be a relative orientation with respect to the angle, direction, or heading corresponding to the camera 114.

Determination of location and orientation can be done based on images captured by the camera 114. This may include running an image recognition algorithm to determine the location and/or orientation of the microphone 120. In some examples, the microphone 120 may include a light, logo, or other defining feature. For instance, where the microphone is in a square or rectangular shape, a light may be positioned in one corner. The light may be positioned in the same location on each microphone of this type, and by determining the position of the light on the microphone in the captured image, the orientation of the microphone may be determined. Similarly, where the microphone has a distinct shape (e.g., a dynamic microphone used by a musician on a stage), the orientation may be determined based on the image of the microphone. Further, one or more other characteristics of microphone 120 may be determined based on the captured images.

In some examples, determination of the location and orientation of the microphone 120 may be done via one or more received signals (such as signals received from the microphone 120, or from the use via the user-interface). For instance, microphone 120 may include one or more components configured to transmit signals to the computing device. The signals may then be used to determine a distance between the microphone and the computing device, for instance by using the Received Signal Strength Indicator (RSSI), time-of-flight (TOF), angle of arrival, and/or any other technique for determining the relative position and orientation of the microphone 120 with respect to the camera 114. In addition, some examples, may include the use of gyroscopes, magnetometers, and one or more other sensors for use in determining the relative position and orientation of the microphone with respect to the camera.

In some examples, the computing device 110 may receive location and orientation data from the microphone, and the location and orientation of the microphone relative to the camera may be determined based on the received location and orientation data.

In some examples, the user may input the microphone orientation and/or location via the user interface of the computing device. The user may touch the microphone within the image displayed, and indicate an orientation of the microphone during a set-up process.

The example method may also include determining one or more parameters of a pick-up pattern of microphone 120. These microphone parameters may include a shape, size, depth, breadth, and/or any other physical dimension of the pick-up pattern of the microphone. They can also include the number of lobes, orientation of the lobes, and various other metrics of the lobes of the microphone. This is particularly useful where the microphone includes two or more lobes, and/or where the microphone is an array microphone or steerable microphone (i.e., a microphone having one or more steerable pick-up patterns).

In some examples, microphone 120 may be a fixed pattern microphone, and determining one or more parameters of the pick-up pattern of the fixed pattern microphone may include selecting a first pick-up pattern corresponding to the fixed pattern microphone from a plurality of predetermined pick-up patterns. Computing device 110, or a computing device communicatively coupled thereto, may have a plurality of microphone pick-up patterns stored in memory.

In some examples, the microphone type may be determined, and the corresponding pick-up pattern may be selected. The microphone, location, orientation, type, and other microphone characteristics may be input by a user (via the user-interface), or may be detected or determined based on communication between the microphone and the computing device. Alternatively, the microphone type may be determined based on an analysis of the captured images. A stored pick-up pattern may be selected based on the determined microphone type, as well as the one or more determined microphone characteristics.

In some examples, the pick-up pattern may be determined based on the microphone type, and/or based on the determined position and orientation of the microphone. For instance, the type may dictate the shape of the pattern, but the location and orientation may determine size, directivity, reflections off the environment, and more.

In some examples, the determined pick-up pattern may factor in environmental effects (e.g., walls, objects, etc.) that may impact the shape, size, directivity, and other parameters of the pick-up pattern. This may be done via image recognition and/or analysis to determine one or more objects or surfaces in the environment, as well as by detecting or receiving other signal inputs indicating the status of the environment surrounding the microphone.

In some examples, the microphone 120 may be a steerable microphone (i.e., an array microphone having one or more steerable pick-up patterns). Where the microphone is a steerable pattern microphone, it may also be configured to provide lobe coordinates to the computing device. The lobe coordinates may include the direction, size, shape, etc. of one or more lobes of the pick-up pattern of the steerable microphone. The received coordinates may indicate the directivity of the pick-up pattern with respect to the microphone. For example, the received coordinates may indicate that one or more lobes are directed left, right, center, etc., as well as the size, shape, orientation, and more.

In some examples, one or more parameters of the pick-up pattern may be determined based on the received lobe coordinates.

The example method may also include determining a visual representation of the pick-up pattern based on the one or more parameters, and displaying the visual representation of the pick-up pattern overlaid on the image of the microphone. Determining the visual representation can include determining appropriate size, shape, etc. based on the determined microphone characteristics. It can also include determining the visual representation based on the distance to the camera, location of the microphone within the environment, and orientation of the microphone.

Figure 3A:
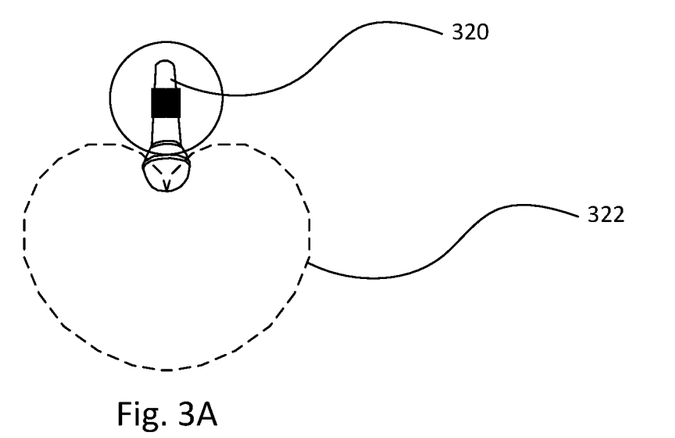
FIGS. 3A-C illustrate perspective views of an example microphone having a pick-up pattern, according to embodiments of the present disclosure.
Figure 3B:
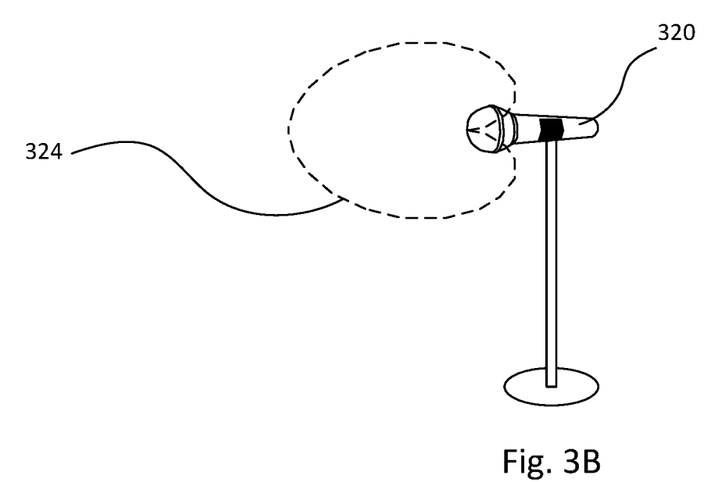
Figure 3C:
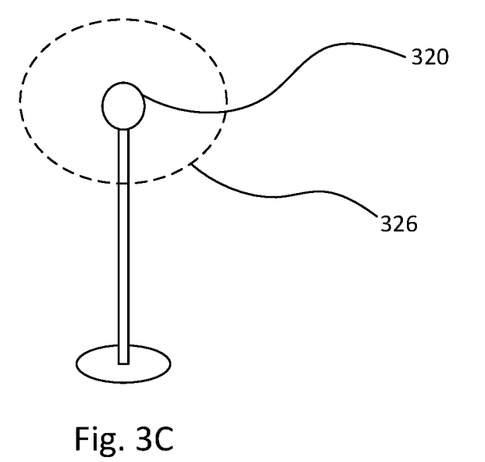

FIGS. 3A-C illustrate several perspective views of a microphone 320. FIG. 3A shows an overhead perspective view of microphone 320 having a pick-up pattern 322. FIG. 3B illustrates a side view of the microphone 320 having a pickup pattern 324. FIG. 3C illustrates a front perspective view of the microphone 320 having a pick-up pattern 326. As can be seen in FIGS. 3A-C, the position of the camera with respect to the microphone 320 can dictate the shape of the pick-up pattern displayed. As such, when the camera is moved around the microphone from a first position to a second position, the pick-up pattern may remain stationary in space, however the visual representation of the pick-up pattern may change to match or correspond to the particular location and orientation of the microphone with respect to the camera. In this manner, the user is able to see the visual representation of the microphone pick-up pattern from the side, and from a "head-on" perspective, depending on where the camera is positioned.

In some examples, the pick-up pattern may not have a distinct edge. Rather, the pick-up pattern may have a gradient, or gradual change in sensitivity as the distance and angle from the center of the microphone changes. In this case, the visual representation of the pick-up pattern displayed to the user may include shading, colors, and/or other visual features that indicate the different in sensitivity and directivity of the microphone in various directions and at various distances.

In some examples, the visual representation of the pick-up pattern may indicate various information, such as whether the microphone is muted or not, whether a given lobe is "on" in the automixer, and more. This information may be received from the microphone. The visual representation may then change color, shading, become a dashed outline, or change in some other way to indicate whether the microphone is muted or not, whether the lobe is on, and/or some other status.

In some examples, the computing device and/or camera may be configured to move from a first location to a second location with respect to the microphone. This movement may occur after the pick-up pattern has been overlaid onto the image while the camera is in the first location. In this instance, the computing device may then be configured to determine that the movement has occurred. Responsive to determining that the movement has occurred, and based on the determined movement, the computing device may be configured to determine an updated location and orientation of the microphone relative to the camera. The computing device may also determine an updated visual representation of the pick-up pattern, based on the updated location and orientation. The computing device may then be configured to display the updated visual representation of the pick-up pattern. In this way, the user can move around the microphone, and during/after that movement has occurred the user is able to see the visual representation of the pick-up pattern from each location. In some examples, a threshold movement or change in location may be met before an updated pick-up pattern is displayed (e.g., movement around the microphone greater than 5 degrees). Alternatively, an updated pick-up pattern may be displayed at regular or irregular intervals, based on a processing time (e.g., updated 30 times per second, or whenever there is a received signal input from the microphone). Other thresholds may be used as well.

In some examples, a particular pick-up pattern may be saved or stored for later use. The user may interact with the user-interface to call up the saved pick-up pattern, and control the microphone to have the saved pick-up pattern via communication with the user interface.

In some examples, two or more microphones may be used at the same time, or a single microphone array may have two or more independently steerable lobes or pick-up patterns. In this case, the image may capture one or both of the microphones, determine respective positions and orientations for each microphone or lobe, and display respective visual representations of the pick-up pattern for each microphone or lobe. This may be particularly useful in a conferencing setting in which multiple microphones are used to capture audio from several different locations, or one or more microphone arrays are used to steer one or more pick-up patterns toward multiple speakers in a room. The computing device may display the multiple pick-up patterns corresponding to the microphones and/or lobes of the array as they are steered in various directions. Further, the computing device may indicate whether one or more of the lobes corresponds to an "active speaker" by changing a color, shading, or some other visual effect.

Figure 4A:
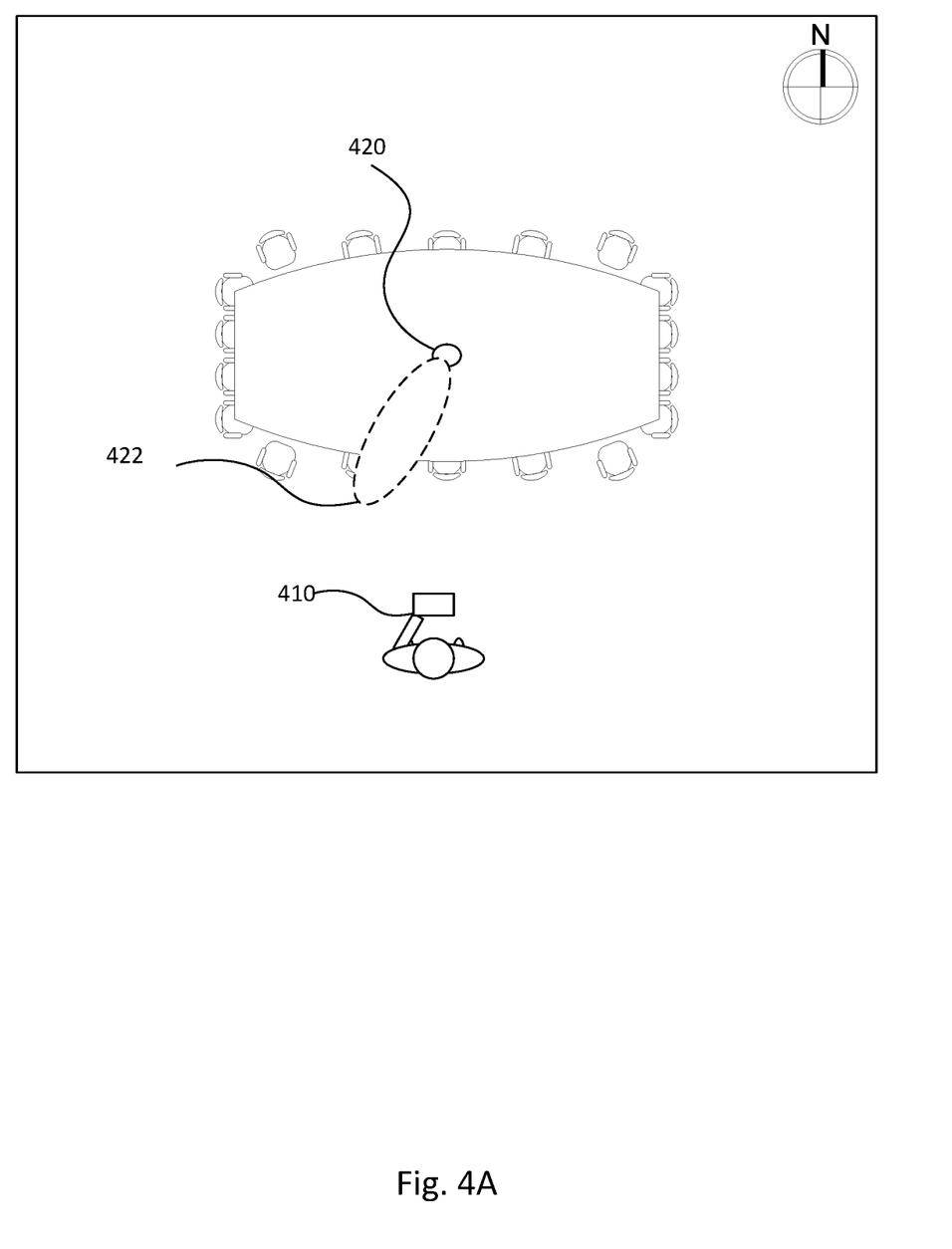
FIGS. 4A-B illustrate overhead perspective views of an example environment, according to embodiments of the present disclosure.
Figure 4B:
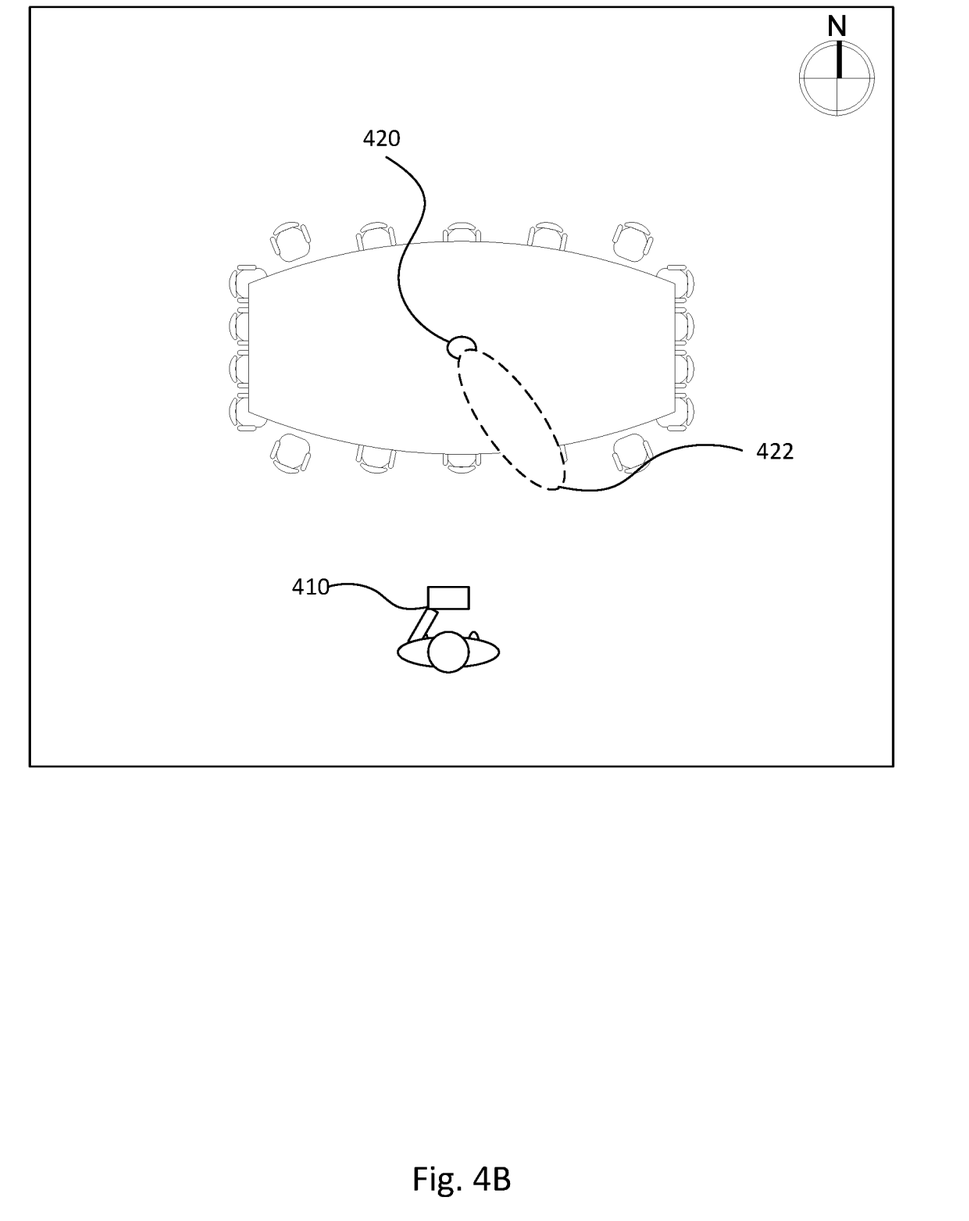

FIGS. 4A and 4B illustrate overhead views of an environment 400. In particular, FIG. 4A illustrates a steerable microphone 420 having a pick-up pattern 422 directed in a first direction, and FIG. 4B illustrates the same steerable microphone having the pick-up pattern 422 directed in a second direction. The transition from FIG. 4A to 4B is facilitated by input from the user into the computing device 410.

The user may input a command via the user interface of computing device 410. The user may wish to change the direction of the steerable microphone pick-up pattern 422. To do so, the use may touch, click, tap, or otherwise interact with the computing device. In some examples, the user interface may be a touch screen display, showing the microphone 420 and its corresponding pick-up pattern 422. As discussed further with respect to FIGS. 4C-E, the user may touch and drag the pick-up pattern 422 from the left to the right on the screen. In response, the computing device may transmit an instruction to the microphone 420 to cause the microphone to change the direction of the pick-up pattern 422.

Figure 4C:
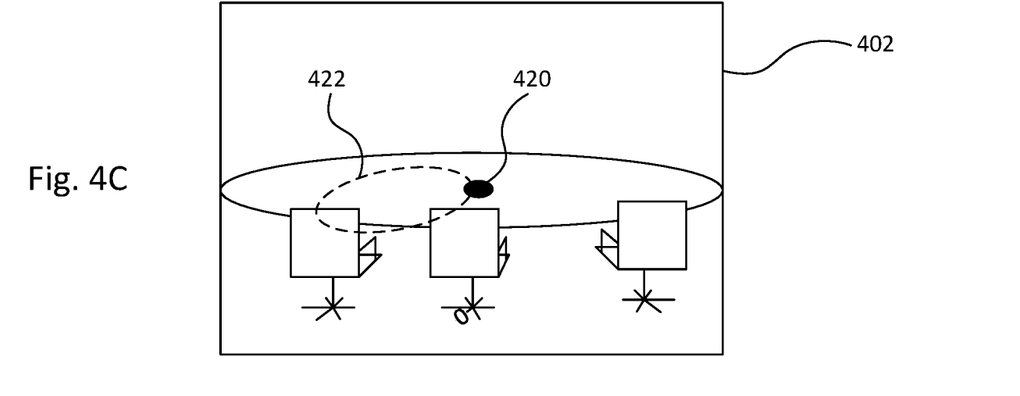
FIGS. 4C-E illustrate a series of views of an example computing device user interface used to control a microphone, according to embodiments of the present disclosure.
Figure 4D:
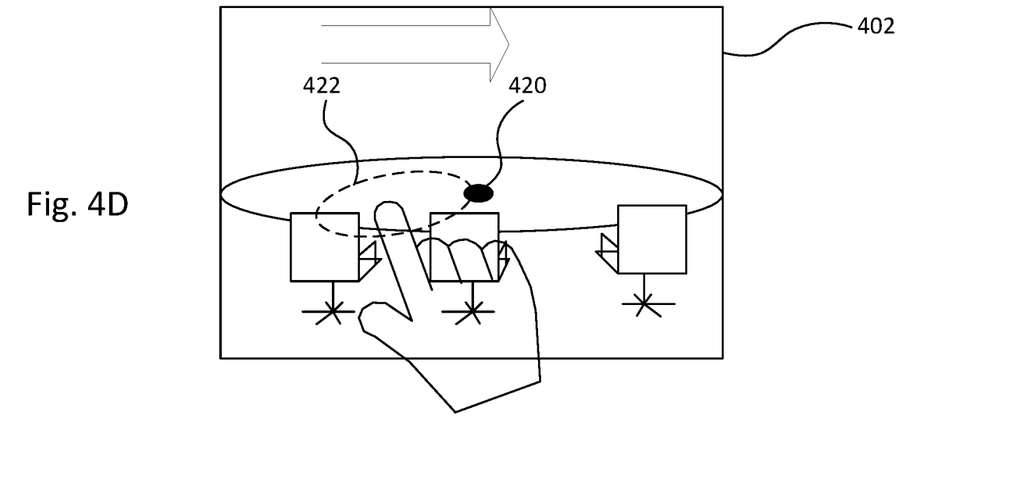
Figure 4E:
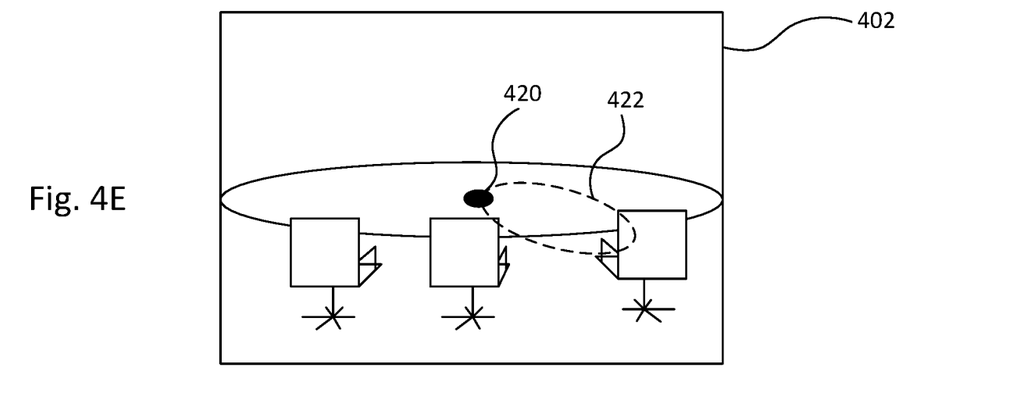

FIGS. 4C-E illustrate the user interface 402 of the computing device 410 during this procedure. In FIG. 4C, the display shown the microphone 420 having a pick-up pattern directed to the left. This is shown visually on the display of the user interface 402.

FIG. 4D illustrates a hand of the user touching the user interface 402. In particular, the hand touches the pick-up pattern 422, and slides to the left (e.g., touch and drag). Responsive to this user input, the computing device may transmit an instruction to the microphone 420 to modify one or more parameters of the pick-up pattern 422 of the microphone. The computing device may then determine a modified visual representation of the pick-up pattern, after the instruction has been sent. The computing device may then display the modified visual representation of the pick-up pattern overlaid on the image of the microphone 420, as shown in FIG. 4E.

FIGS. 4A-E illustrate an input in the form of a user's hand on a touch screen of the computing device. However, is should be understood that other forms of input may be used, such as a mouse, keyboard, stylus, etc.

Figure 5:
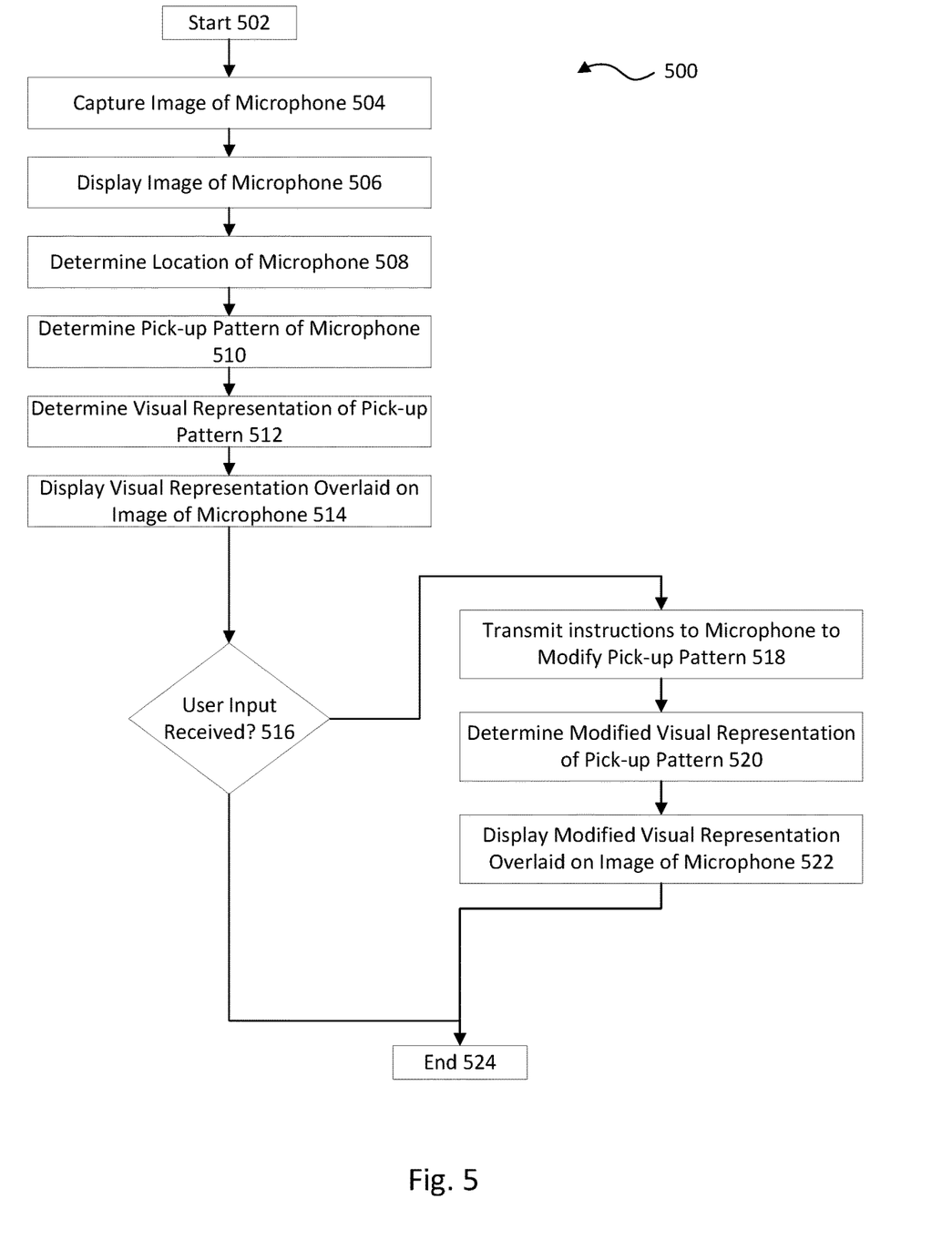
FIG. 5 is a flowchart illustrating an example method according to embodiments of the present disclosure.

FIG. 5 illustrates a flowchart of an example method 500 according to embodiments of the present disclosure. Method 500 may allow a user to see a visual representation of a microphone pick-up pattern overlaid on an image or video of the microphone, providing an augmented reality view of the microphone and its corresponding pick-up pattern. The flowchart of FIG. 5 is representative of machine readable instructions that are stored in memory (such as memory 220) and may include one or more programs which, when executed by a processor (such as processor 210) may cause computing device 110 and/or one or more systems or devices to carry out one or more functions described herein. While the example program is described with reference to the flowchart illustrated in FIG. 5, many other methods for carrying out the functions described herein may alternatively be used. For example, the order of execution of the blocks may be rearranged or performed in series or parallel with each other, blocks may be changed, eliminated, and/or combined to perform method 500. Further, because method 500 is disclosed in connection with the components of FIGS. 1-4, some functions of those components will not be described in detail below.

Method 500 may start at block 502. At block 504, method 500 may include capturing an image of a microphone. This may be done by a camera of the computing device, such as where the computing device is a smartphone or tablet. The captured image may then be displayed at block 506.

At block 508, method 500 may include determining a location of the microphone 508. In some examples, one or more other characteristics of the microphone may be determined as well, such as the orientation of the microphone. The determined location and/or orientation may be relative to the position and orientation of the camera, or may be relative to some other third frame of reference.

At block 510, method 500 may include determining a pick-up pattern of the microphone. This may include determining the type of microphone, and selecting a pick-up pattern based on the type of microphone. Other factors may be considered as well.

At block 512, method 500 may include determining a visual representation of the pick-up pattern. Determining the visual representation may factor in the position of the camera with respect to the microphone. For instance, the visual representation may change based on where the camera is located, such that the visual representation corresponds to what the user would "see" if the pick-up pattern was visible.

At block 5140, method 500 may include displaying the visual representation overlaid on the image of the microphone. This display allows the user to see what the pick-up pattern looks like in real time via augmented reality.

At block 516, method 500 may include determining whether the user has provided input to the computing device. The user input may be a command to modify one or more characteristics of the microphone, such as by steering the pick-up pattern in a different direction.

If input has been received, method 500 may include transmitting instructions to the microphone to modify the pick-up pattern at block 518.

At block 520, method 500 may include determining a modified visual representation of the pick-up pattern. This may occur after the instruction has been sent, and after the modification to the pick-up pattern has been made. Then, at block 522, method 500 may include displaying the modified visual representation of the pick-up pattern overlaid on the microphone. The user can thus interact with the user interface of the computing device in order to modify the pick-up pattern, and immediately view the resulting change on the display. Method 500 may then end at block 524.

In this application, various features, examples, and embodiments have been disclosed with reference to a microphone having a pick-up pattern that is visually displayed to a user. However it should be understood that the same features disclosed herein can apply to the use of an antenna having a gain pattern, rather than or in addition to a microphone having a pick-up pattern. For example, some embodiments may include a computing device capturing an image of an antenna and determining a location and orientation of the antenna with respect to the camera. The computing device may then determine a gain pattern of the antenna. The computing device may then determine a visual representation of the gain pattern, and overlay the visual representation on the image of the antenna. As such, it should be understood that the features disclosed herein with respect to a microphone having a pick-up pattern can also apply to an antenna having a gain pattern.

Further, it should be understood that the same features disclosed herein can apply to the use of a loudspeaker, and visualizing the loudspeaker output pattern. For example, some embodiments may include a computing device capturing an image of a loudspeaker and determining a location and orientation of the loudspeaker with respect to the camera. The computing device may then determine a pattern of the loudspeaker output. The computing device may then determine a visual representation of the loudspeaker output pattern, and overlay the visual representation on the image of the loudspeaker. As such, it should be understood that the features disclosed herein with respect to a microphone having a pick-up pattern can also apply to a loudspeaker (our plurality of loudspeakers) having a particular output pattern or patterns.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

The invention claimed is:

1. A method comprising:
    capturing, via a camera of a computing device in a first position, a first image of a microphone, wherein the microphone is a steerable pattern microphone or array microphone;
    displaying the first image on a display of the computing device;
    determining, by the computing device, a first location and orientation of the microphone relative to the camera;
    (A) responsive to receiving a first lobe coordinate corresponding to a pick-up pattern of the microphone being steered in a first direction:
        determining a first visual representation of the pick-up pattern based on (1) the first lobe coordinate, (2) the first location and orientation of the microphone relative to the camera, and (3) the microphone being in an unmuted state; and
        displaying the first visual representation of the pick-up pattern overlaid on the first image of the microphone;
    (B) responsive to the microphone being modified to a muted state:
        determining a second visual representation of the pick-up pattern based on (1) the first lobe coordinate, (2)

the first location and orientation of the microphone relative to the camera, and (3) the microphone being in the muted state; and displaying the second visual representation of the pick-up pattern overlaid on the first image of the microphone;

(C) responsive to receiving a second lobe coordinate corresponding to the pick-up pattern of the microphone being steered in a second direction:

determining a third visual representation of the pick-up pattern based on (1) the second lobe coordinate, (2) the first location and orientation of the microphone relative to the camera, and (3) the microphone being in the unmuted state, and displaying the third visual presentation of the pick-up pattern overlaid on the first image of the microphone; and (D) responsive to the microphone being modified to the muted state:

determining a fourth visual representation of the pick-up pattern based on (1) the second lobe coordinate, (2) the first location orientation of the microphone relative to the camera, and (3) the microphone being in the muted state; and displaying the fourth visual representation of the pick-up pattern overlaid on the first image of the microphone.

2. The method of claim 1, further comprising responsive to receiving the first lobe coordinate corresponding to the pick-up pattern of the microphone being steered in the first direction, determining one or more of a shape or a size of the pick-up pattern of the microphone based on the first lobe coordinate and an object in an environment where the microphone is located.

3. The method of claim 2, wherein determining the pick-up pattern of the microphone comprises:

determining a presence of the object in the environment;
determining the pick-up of the microphone based on the first lobe coordinate; and
modifying the one or more of the shape or the size of the pick-up pattern based on the presence of the object.

4. The method of claim 1, further comprising:
receiving, by the computing device, the first lobe coordinate.

5. The method of claim 4, further comprising determining one or more parameters of the pick-up pattern of the microphone based on the received first lobe coordinates.

6. The method of claim 1, wherein the first location and orientation of the microphone relative to the camera are determined based on the first image.

7. The method of claim 1, further comprising:
receiving location and orientation data from the microphone, wherein the first location and orientation of the microphone relative to the camera are determined based on the received location and orientation data.

8. The method of claim 1, further comprising:
determining one or more parameters of the pick-up pattern by receiving the one or more parameters from the microphone, wherein the one or more parameters of the pick-up pattern comprise one or more of a length, width, size, and shape corresponding to the pick-up pattern.

9. The method of claim 1, further comprising:
receiving user input via a user interface of the computing device, wherein the user interface comprises a touch screen, and wherein the user input comprises a touch and drag motion; and responsive to receiving the user input, transmitting an instruction to the microphone to modify one or more parameters of the pick-up pattern.

10. The method of claim 1, wherein determining the first location and orientation of the microphone relative to the camera comprises determining the first location and orientation of the microphone relative to the camera based on a shape of the microphone.

11. The method of claim 1, further comprising:
capturing, via the camera of the computing device in a second position different from the first position, a second image of the microphone;

displaying the second image on the display of the computing device;

determining, by the computing device, a second location and orientation of the microphone relative to the camera;

determining a fifth visual representation of the pick-up pattern based on (1), the first lobe coordinate, and (2) the second location and orientation of the microphone relative to the camera; and displaying the fifth visual representation of the pick-up pattern overlaid on the second image of the microphone.

12. A computing device comprising:
a camera configured to capture a first image of a microphone when positioned in a first position, wherein the microphone is a steerable pattern microphone or array microphone;

a user interface; and
a processor configured to:
display the first image of the microphone on the user interface;

determine a first location and orientation of the microphone relative to the camera;

(A) responsive to receiving a first lobe coordinate corresponding to a pick-up pattern of the microphone being steered in a first direction, determine a first visual representation of the pick-up pattern based on (1) the first lobe coordinate, (2) the first location and orientation of the microphone relative to the camera, and (3) the microphone being in an unmuted state; and display the first visual representation of the pick-up pattern overlaid on the first image of the microphone;

(B) responsive to the microphone being modified to a muted state:

determine a second visual representation of the pick-up pattern based on (1) the first lobe coordinate, (2) the first location and orientation of the microphone relative to the camera, and (3) the microphone being in the muted state; and display the second visual representation of the pick-up pattern overlaid on the first image of the microphone, (C) responsive to receiving a second lobe coordinate corresponding to the pick-up pattern of the microphone being steered in a second direction:

determining a third visual representation of the pick-up pattern based on (1) the second lobe coordinate, (2) the first location and orientation of the microphone relative to the camera, and (3) the microphone being in the unmuted state, and displaying the third visual presentation of the pick-up pattern overlaid on the first image of the microphone; and (D) responsive to the microphone being modified to the muted state:
  determining a fourth visual representation of the pick-up pattern based on (1) the second lobe coordinate, (2) the first location orientation of the microphone relative to the camera, and (3) the microphone being in the muted state; and
  display the fourth visual representation of the pick-up pattern overlaid on the first image of the microphone.

13. The computing device of claim 12, wherein the process is further configured to: responsive to receiving the first lobe coordinate corresponding to the pick-up pattern of the microphone being steered in the first direction, determine one or more of a shape or a size of the pick-up pattern of the microphone based on the first lobe coordinate and an object in an environment where the microphone is located.

14. The computing device of claim 12, wherein the processor is further configured to:
  receive, from the steerable pattern microphone or array microphone, the first lobe coordinates.

15. The computing device of claim 12, wherein the first location and orientation of the microphone relative to the camera are determined based on the first image.

16. The computing device of claim 12:
  wherein the user interface is configured to receive user input and comprises a touch screen, and wherein the user input comprises a touch and drag motion; and
  wherein the processor is further configured to, responsive to receiving the user input, transmit an instruction to the microphone to modify one or more parameters of the pick-up pattern.

17. The computing device of claim 12, wherein the camera is further configured to capture a second image of the microphone when positioned in a second position and wherein the processor is further configured to:
  display the second image of the microphone on the user interface;
  determine a second location and orientation of the microphone relative to the camera;
  determine a fifth visual representation of the pick-up pattern based on (1) the first lobe coordinate, and (2) the second location and orientation of the microphone relative to the camera; and
  display the fifth visual representation of the pick-up pattern overlaid on the second image.

18. A non-transitory, computer-readable medium having instructions stored thereon that, when executed by a processor, cause a performance of a set of acts comprising:
  capturing, via a camera of a computing device in a first position, a first image of a microphone, wherein the microphone is a steerable pattern microphone or array microphone;
  displaying the first image on a user interface of the computing device;
  determining a first location and orientation of the microphone relative to the camera;
  (A) responsive to receiving a first lobe coordinate corresponding to a pick-up pattern of the microphone being steered in a first direction:
    determining a first visual representation of the pick-up pattern based on (1) the first lobe coordinate, (2) the first location and orientation of the microphone relative to the camera, and (3) the microphone being in an unmuted state; and
    displaying the first visual representation of the pick-up pattern overlaid on the first image of the microphone;
  (B) responsive to the microphone being modified to a muted state:
    determining a second visual representation of the pick-up pattern based on (1) the first lobe coordinate, (2) the first location and orientation of the microphone relative to the camera, and (3) the microphone being in the muted state; and
    displaying the second visual representation of the pick-up pattern overlaid on the first image of the microphone;
  (C) responsive to receiving a second lobe coordinate corresponding to the pick-up pattern of the microphone being steered in a second direction:
    determining a third visual representation of the pick-up pattern based on (1) the second lobe coordinate, (2) the first location and orientation of the microphone relative to the camera, and (3) the microphone being in the unmuted state, and
    displaying the third visual presentation of the pick-up pattern overlaid on the first image of the microphone; and
  (D) responsive to the microphone being modified to the muted state:
    determining a fourth visual representation of the pick-up pattern based on (1) the second lobe coordinate, (2) the first location orientation of the microphone relative to the camera, and (3) the microphone being in the muted state; and
    displaying the fourth visual representation of the pick-up pattern overlaid on the first image of the microphone.

19. The non-transitory, computer-readable medium of claim 18, the set of acts further comprising:
  capturing, via the camera of the computing device in a second position different from the first position, a second image of the microphone;
  displaying the second image on the user interface of the computing device;
  determining, by the computing device, a second location and orientation of the microphone relative to the camera;
  determining a fifth visual representation of the pick-up pattern based on (1) the first lobe coordinate, and (2) the second location and orientation of the microphone relative to the camera; and
  displaying the fifth visual representation of the pick-up pattern overlaid on the second image of the microphone.

20. The non-transitory, computer-readable medium of claim 18, the set of acts further comprising: responsive to receiving the first lobe coordinate corresponding to the pick-up pattern of the microphone being steered in the first direction, determining one or more of a shape or a size of the pick-up pattern of the microphone based on the first lobe coordinate and an object in an environment where the microphone is located.

* * * * *

UNITED STATES PATENT AND TRADEMARK OFFICE
CERTIFICATE OF CORRECTION

PATENT NO. : 11,494,158 B2  
APPLICATION NO. : 16/408061  
DATED : November 8, 2022  
INVENTOR(S) : Christopher George Reiger et al.

It is certified that error appears in the above-identified patent and that said Letters Patent is hereby corrected as shown below:

In the Claims

Claim 1, Column 13, Line 15, "presentation" should be changed to --representation--.
Claim 1, Column 13, Line 22, "location orientation" should be changed to --location and orientation--.
Claim 3, Column 13, Line 38, "pick-up of the" should be changed to --pick-up pattern of the--.
Claim 12, Column 14, Line 60, "determining" should be changed to --determine--.
Claim 12, Column 14, Line 65, "displaying" should be changed to --display--.
Claim 12, Column 14, Line 65, "presentation" should be changed to --representation--.
Claim 12, Column 15, Line 3, "determining" should be changed to --determine--.
Claim 12, Column 15, Line 5, "location orientation" should be changed to --location and orientation--.
Claim 13, Column 15, Line 12, "process" should be changed to --processor--.
Claim 18, Column 16, Line 24, "presentation" should be changed to --representation--.
Claim 18, Column 16, Line 31, "location orientation" should be changed to --location and orientation--.

Signed and Sealed this
Twenty-eighth Day of March, 2023

Katherine Kelly Vidal
*Director of the United States Patent and Trademark Office*